Feb. 25, 1930.         J. W. PLACE            1,748,144
                       THERMOMETER
                    Filed Nov. 27, 1923
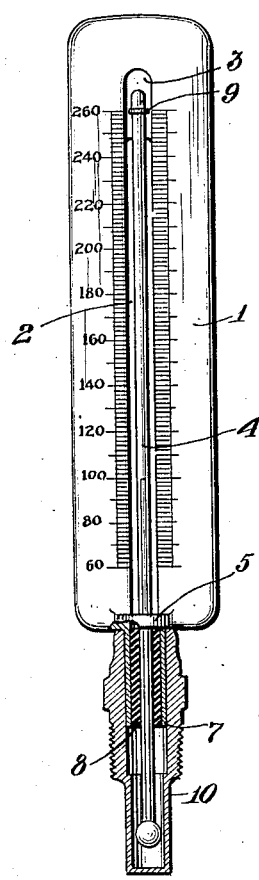
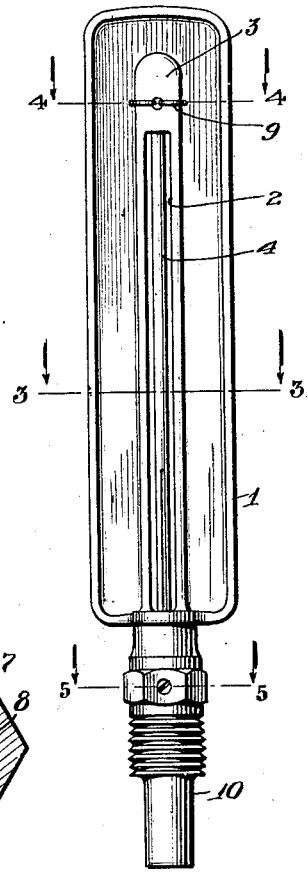
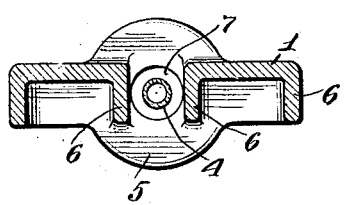
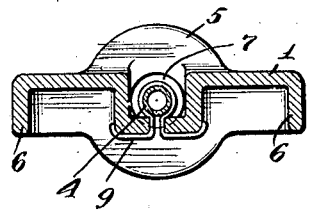
INVENTOR
JOSIAH W. PLACE
BY
Parker W. Page
ATTORNEY Patented Feb. 25, 1930

1,748,144

UNITED STATES PATENT OFFICE

JOSIAH W. PLACE, OF WEST ORANGE, NEW JERSEY, ASSIGNOR TO UNITED STATES GAUGE COMPANY, OF NEW YORK, N. Y., A CORPORATION OF PENNSYLVANIA

THERMOMETER

Application filed November 27, 1923. Serial No. 677,222.

The invention upon which is based the present application for letters patent is a thermometer of the class more commonly used for attachment to boilers for indicating the temperature of the water therein. In its construction it follows broadly that generally employed in such devices, but it is distinguished by certain novel and highly useful features of construction which contribute materially to its cheapness, durability and general efficiency.

The device as a whole comprises a metal socket which is to be inserted, usually by a threaded connection with the shell, into a boiler or similar device, and a thermometer of special construction which may be fitted into or removed from such socket at will and which indicates the temperature of the medium surrounding the socket.

The thermometer proper consists of a cast metal plate of steel, iron or other metal, with a longitudinal slot to receive the thermometer tube and having flanges projecting from the back along all its edges. Integral with this plate a tubular extension is cast, and through an insulating gasket in this the thermometer tube extends, the bulb end extending sufficiently beyond it to occupy its proper position in the socket when the instrument is in place.

This improved device is shown in detail in the accompanying drawing, in which

Fig. 1 is a view in elevation of the complete instrument with the socket and tubular extension in section.

Fig. 2 is a rear view of the same in elevation.

Fig. 3 is a section on line 3—3 of Fig. 2.

Fig. 4 is a similar section on line 4—4; and

Fig. 5 is a section on line 5—5.

The plate 1 is of the usual conformation and contains a longitudinal slot 2 with a shelf 3 at its upper end to which the end of the tube 4 is secured. The base or lower part of the plate has a circular flange 5, and all edges of the plate have flanges 6 extending rearwardly.

This plate is made of a single casting, of iron, steel or other metal, and is formed with a tubular extension 7, from the flange 5, which is open at both ends, the bore being in direct line with the space within the flanged slot. A thermometer tube 4 is passed up through this tubular extension and is secured in place therein by an insulating gasket 8. The bulb end projects beyond or below the end of such extension and the other end of the thermometer is secured to the plate at 9 in the usual manner. Upon the face of the plate and on both sides of the slot there appear markings which are graduated to represent degrees of temperature, the distance between successive markings in the present embodiment representing a difference in temperature of 2°.

The socket 10 for receiving the tubular extension and tube is of the usual construction and is screwed into the boiler shell. The extension 7 should fit smoothly into this socket so that it may be inserted or withdrawn when necessary.

No further specific details of the construction need be gone into as they are such as are well known and commonly used in devices of this class.

This I believe to be the simplest, cheapest, most durable and efficient instrument of its class that has been produced.

What I claim is:

1. A thermometer for boilers, comprising in combination an elongated metal plate having a longitudinal slot and rearwardly projecting flanges along the lateral edges of the plate and along the lateral edges of said slot, a tubular extension at the lower end of the plate and integral therewith, a socket with a closed lower end into which the said tubular extension is adapted to fit, an insulating gasket within said tubular extension, and a thermometer tube passing through said insulating gasket with its bulb end extending beyond said insulating gasket and into the socket and having its stem occupying the space between the flanges of the slot, said last named flanges extending a distance greater than the thickness of said stem.

2. In combination, a metal plate having an elongated slot therein for accommodating a thermometer stem, the lateral edges of said slot comprising flanges integral with said plate and extending rearwardly from said plate, a thermometer having a stem of such a thicknes as to be disposed within the extension of the flanges including the distance from the face of said plate to the rear edges of the flanges, and means including a socket member for supporting said plate and thermometer.

In testimony whereof I hereto affix my signature.

JOSIAH W. PLACE.